3,474,083
PROCESS FOR THE SYNTHESIS OF COPOLYMERS OF LYSINE AND GLUTAMIC OR ASPARTIC ACID
Akio Shiga, Machida-shi, and Hideyuki Furukawa and Akio Kanemitsu, Tokyo, Japan, assignors to Kyowa Hakko Kogyo Co., Ltd., Tokyo, Japan, a corporation of Japan
No Drawing. Continuation-in-part of application Ser. No. 411,082, Nov. 13, 1964. This application Mar. 14, 1968, Ser. No. 712,970
Claims priority, application Japan, Dec. 9, 1963, 38/65,912
Int. Cl. C07c 103/52
U.S. Cl. 260—112.5        7 Claims

ABSTRACT OF THE DISCLOSURE

A process for the preparation of copolypeptides which comprises heating (a) L-lysine or L-lysine hydrochloride and (b) L-glutamic acid, L-aspartic acid or the sodium salts thereof in an aqueous solution at a temperature of from 80° to 160° C. under reflux. The products have a pleasing taste and may be used as flavor-enhancers.

---

The present application is a continuation-in-part of application Ser. No. 411,082, filed in the United States Patent Office on Nov. 13, 1964, and now abandoned.

This invention relates to a process for preparing co-polypeptides employing L-lysine as one reaction component. More specifically, the invention is characterized by the feature that L-lysine, as the free base or in the form of its hydrochloride, is heated with an acidic amino acid, such as L-glutamic acid or L-aspartic acid, as the free acid or in the form of a salt thereof, to a temperature of 80° to 160° C. in an aqueous medium, whereby polymerization into the desired copolypeptides takes place.

Copolypeptides obtained by this method are hygroscopic and very soluble in water, and are distinguished in one way from known copolypeptides by their difference in taste. Prior known peptides are tasteless, or have a bitter or sour taste. The particular copolypeptides of the present invention are characterized by an acceptable and very delicate flavor. They taste differently than the starting simple amino acids, being high molecular weight compounds. Co-polypeptides produced according to the present invention have the property of improving—enhancing or intensifying—the natural flavor and taste of seasonings, foods and beverages into which they are incorporated. Moreover, when used with sodium 5′-inosinate or sodium 5′-guanylate, the said copolypeptides exert a synergistic action with regard to taste.

Prior conventional processes for the production of co-polypeptides include those wherein two or more amino acids are co-fused under anhydrous conditions and thus copolymerized, or those wherein use is made of amino acids modified with so-called "protecting" radicals. These are less than satisfactory because of relatively low yields and the uneconomic character of the procedures.

The present invention, however, provides a simple and industrially feasible and economic method, which is free from the prior art defects, and according to which the starting simple amino acids, for example, L-lysine hydrochloride and monosodium L-glutamate, are heated together in water at 80° to 160° C. under reflux until the desired copolypeptides of lysine and glutamic acid are produced. Similar copolypeptides can be produced in like manner by heating the following combinations of substances in water to 80° to 160° C. to effect the desired copolypeptidization: L-lysine and L-glutamic acid, L-lysine hydrochloride and L-glutamic acid, L-lysine and monosodium L-glutamate or L-lysine-L-glutamate, L-lysine and L-aspartic acid or monosodium L-aspartate, etc.

The method of the invention is primarily distinguished from prior processes for the production of copolypeptides in that the reaction (polymerization) is carried out in aqueous medium, for example, in water alone, within a closely regulated temperature range, and with combinations of particular reactants which always include L-lysine or its hydrochloride as one reactant and L-glutamic acid or L-aspartic acid or salts thereof, especially the sodium salts, as another reactant. The quantity of water present is relatively low and as little as, e.g., about 5% by weight, relative to the weight of the initial amino acid reactants may be employed, and no more than about 20% by weight of the water is needed.

The reaction products (copolypeptides) can be recovered by evaporating off the water from the reaction mixture under reduced pressure and can then be purified by washing with aqueous or substantially anhydrous or anhydrous alcohol (ethanol), by dialysis against running water, by electrophoresis, by passage through ion exchange membranes, or by column chromatography, etc.

In addition to the previously described taste- and flavor-enhancing properties, the copolypeptides obtained according to this invention have properties characteristic of the high molecular weight amphoteric electrolytes, such as electrical conductivity, a chelate-forming property, and affinities toward various organic compounds.

These properties, in addition to the flavorous property, indicate the applicability thereof to manufactured foods and beverages for the purpose of imparting a flavor-retaining ability, antioxidation ability, and ability of water retention. When employed in cellulose products, they exhibit the characteristic of antistaticity.

The following specific examples are intended to illustrate typical presently preferred embodiments of this invention but there are many applicable examples within the scope and ambit of this invention so that it is not intended that the latter should be limited to the specific examples shown. In these examples, parts by weight bear the same relation to parts by volume as do grams to milliliters. Percentages are by weight.

Example I 180 parts by weight of L-lysine hydrochloride and 169 parts by weight of monosodium L-glutamate are reacted in 35 parts by volume of water at 80° to 140° C. under reflux for 2 hours with agitation; the reaction mixture thus obtained is washed several times with 99% ethanol, and the resultant milky white viscous products are vacuum-dried, 265.6 parts by weight of copolypeptides (dry weight) being obtained.

When the thus-obtained copolypeptides ($x$ L-lysine·HCl, $y$ monosodium L-glutamate) are added to synthetic beer, synthetic sake or similar products, their favorable effect on the natural flavor of the substrate is readily detected, even when the amount added is only about 0.1% by weight.

Example II 146 parts by weight of L-lysine and 147 parts by weight of L-glutamic acid are reacted in 32 parts by volume of water exactly in the manner set forth in Example I; the purification step with 99% ethanol is repeated three times, and the products then vacuum-dried, the dried copoly-peptides thus obtained amounting to 278.4 parts by weight An aqueous solution containing the copolypeptides ($x$ L-lysine, $y$ L-glutamic acid) obtained according to this example together with sodium 5′-inosinate or sodium 5′-guanylate has a good taste similar to that of a boiled aqueous extract of tangles (*Laminaria saccharina*).

Example III 146 parts by weight of L-lysine and 133 parts by weight of L-aspartic acid are reacted in 38 parts by volume of water at 120° to 160° C. for 3 hours in the same manner as that described in Examples I and II, and after washing the product with 95% ethanol four times, the product is vacuum-dried, yielding 222 parts by weight of white dried materials (copolypeptides).

Treatment of textiles comprised of wool, cotton, or Tetron (trademark for polyester synthetic fibers) with a 0.1% aqueous solution of the copolypeptides ($x$ L-lysine, $y$ L-aspartic acid) obtained according to this example yields textiles with high antistaticity.

Example IV

In the manner described in the preceding examples, 182 parts by weight of L-lysine hydrochloride and 147 parts by weight of L-glutamic acid are reacted in 45 parts by volume of water at 100° to 130° C. for 2 hours; the reaction products thus formed are dialyzed against running water for about 36 hours and then vacuum-dried. 178 parts by weight of dried materials (copolypeptides) are obtained.

When the copolypeptides ($x$ L-lysine hydrochloride, $y$ L-glutamic acid) obtained by this example are used in the manufacture of cakes such as Kastera (baked sweetmeat consisting essentially of flour, butter and sugar) and cup cakes, it is found that the property of retention of moisture by these baked goods is improved.

Example V

In the manner described in the preceding examples, 146 parts by weight of L-lysine and 169 parts by weight of monosodium L-glutamate are reacted in 33 parts by volume of water at 90° to 140° C. for 3 hours and the products thus formed are dialyzed aaginst running water for about 36 hours and then vacuum-dried, 156 parts by weight of dried materials (copolypeptides) being obtained.

The magnitude of the reduced pressure employed in the vacuum drying operation in this and in the other examples is variable; a simple water-jet vacuum is sufficient.

The copolypeptides ($x$ L-lysine, $y$ monosodium L-glutamate) obtained by this example have properties similar to those of the copolypeptides obtained according to Examples I, II, III and IV.

Example VI

In the manner described in the preceding examples, 183 parts by weight of L-lysine hydrochloride and 56 parts by weight of monosodium L-aspartate are reacted in 15 parts by volume of water at 130° to 160° C. for 4 hours to produce the corresponding copolypeptides.

The strength of, e.g., wool fibers obtained by applying thereto such copolypeptides during the spinning of the fibers is greater than that of nylon.

Tests on the copolypeptide products obtained in Examples I through VI, respectively, show the following results:

| Product of Example Number | Average molecular weight | Relative viscosity in 5 wt. percent aqueous solution at 30° C. | Water solubility | Melting point (° C.) |
|---|---|---|---|---|
| I | 500 | 1.1186 | Easily soluble | 105–110 |
| II | 500 | 1.1186 | do | 105–110 |
| III | 2,000 | 1.5651 | do | 105–110 |
| IV | 1,000 | 1.3214 | do | 105–110 |
| V | 1,000 | 1.3274 | do | 105–110 |
| VI | 5,000 | 1.9678 | do | 105–110 |

Copolypeptides, as hereinbefore mentioned, are known. The terminology is somewhat analogous to that used in the polymer art. There, a polymer is produced by polymerization of a monomer, and a copolymer is produced by simultaneous polymerization (copolymerization) of two or more different monomers. In the instant situation, an amino acid can be converted to a polypeptide by appropriate treatment (condensation or the like); simultaneous conversion of a plurality of amino acids yields a copolypeptide. Just as the expression "vinyl chloride-vinyl acetate copolymer" indicates the product of the simultaneous polymerization of vinyl chloride and vinyl acetate, the expression, e.g., "L-aspartic acid-L-lysine copolypeptide" signifies the product resulting from the simultaneous polypeptide formation from L-aspartic acid and L-lysine. Since there is random arrangement of the several amino acid residues in the copolypeptide molecule, it is more appropriate to use the "$x$ L-lysine, $y$ L-glutamic acid" type of nomenclature. The $x$ and $y$ magnitudes are variable, depending upon the extent of "copolymerization" achieved.

We claim:

1. A method for the production of copolypeptides by the copolypeptidization of a plurality of amino acids which comprises heating (a) a member selected from the group consisting of L-lysine and L-lysine hydrochloride and (b) a member selected from the group consisting of L-glutamic acid, L-aspartic acid and sodium salts of the said acids for about 2 to 4 hours in an aqueous solution at a temperature of from 80° to 160° C. under reflux, the amount of water present in the reaction mixture ranging from about 5 to about 20% by weight, whereby water-soluble copolypeptide formation is achieved, and recovering the resultant copolypeptides from the reaction mixture by evaporating off the water therefrom under reduced pressure.

2. The process of claim 1, wherein (a) is L-lysine hydrochloride and (b) is monosodium L-glutamate.

3. The process of claim 1, wherein (a) is L-lysine and (b) is L-glutamic acid.

4. The process of claim 1, wherein (a) is L-lysine and (b) is L-aspartic acid.

5. The process of claim 1, wherein (a) is L-lysine hydrochloride and (b) is L-glutamic acid.

6. The process of claim 1, wherein (a) is L-lysine and (b) is monosodium L-glutamate.

7. The process of claim 1, wherein (a) is L-lysine hydrochloride and (b) is monosodium L-aspartate.

References Cited

UNITED STATES PATENTS

| | | | |
|---|---|---|---|
| 3,052,655 | 9/1962 | Fox et al. | 260—78 |
| 3,076,790 | 2/1963 | Fox et al. | 260—78 |

OTHER REFERENCES

Harada et al., J. Am. Chem. Soc. 80, 2694–7 (1958).

Kovacs, Polyamino Acids, Polypeptides and Proteins, Stahmann, ed., U. of Wisconsin Press, Madison, Wis., 1962. pp. 42–45. QP 801.A5,IS.

LEWIS GOTTS, Primary Examiner

MELVYN KASSENOFF, Assistant Examiner

U.S. Cl. X.R.

99—140; 117—139.5, 143; 252—8.8; 260—78